(12) United States Patent
Srivastava

(10) Patent No.: US 7,904,446 B1
(45) Date of Patent: Mar. 8, 2011

(54) SEARCHABLE MENU SYSTEM VIA KEYWORD SEARCH

(75) Inventor: Mohit Srivastava, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 591 days.

(21) Appl. No.: 11/499,441

(22) Filed: Aug. 4, 2006

(51) Int. Cl.
*G06F 7/00* (2006.01)

(52) U.S. Cl. ......... 707/716; 707/705; 707/754; 707/758; 709/201

(58) Field of Classification Search ............... 707/716, 707/706, 754, 758; 709/201
See application file for complete search history.

(56) References Cited

U.S. PATENT DOCUMENTS

| | | | |
|---|---|---|---|
| 6,901,446 B2 * | 5/2005 | Chellis et al. ............ | 709/226 |
| 6,983,271 B2 * | 1/2006 | Morrow et al. ............ | 707/3 |
| 7,181,438 B1 * | 2/2007 | Szabo ............ | 707/2 |
| 7,353,246 B1 * | 4/2008 | Rosen et al. ............ | 709/202 |
| 7,395,511 B1 * | 7/2008 | Robertson et al. ............ | 715/810 |
| 7,451,455 B1 * | 11/2008 | El-Haj ............ | 719/320 |
| 2002/0194164 A1 * | 12/2002 | Morrow et al. ............ | 707/3 |
| 2006/0129915 A1 * | 6/2006 | Chan ............ | 715/512 |
| 2008/0005101 A1 * | 1/2008 | Chandra ............ | 707/5 |

OTHER PUBLICATIONS

Apple, Mac OS X Screenshot received from the Inventor on Jun. 1, 2006.
U.S. Appl. No. 11/035,624, filed Jan. 13, 2005, John W. Peterson.

* cited by examiner

*Primary Examiner* — Wilson Lee
*Assistant Examiner* — Tuan Khanh Phan
(74) *Attorney, Agent, or Firm* — Robert C. Kowert; Meyertons, Hood, Kivlin, Kowert & Goetzel, P.C.

(57) ABSTRACT

Displaying a visual cue is disclosed. One or more search criteria is/are received. One or more objects that are associated with a user interface is/are searched based at least in part on the one or more search criteria to obtain a search result. A sequence of one or more choices associated with accessing the search result is/are obtained. A visual cue is displayed for at least a portion of the sequence of one or more choices.

22 Claims, 7 Drawing Sheets

SEARCHABLE MENU SYSTEM VIA KEYWORD SEARCH

BACKGROUND OF THE INVENTION

In software applications, users access operations, features and/or commands via a user interface. A user interface may comprise one or more pull-down menus, dialog boxes, and/or palettes. To preserve screen space for the file, image, or other data being viewed or operated on, not all user interface objects are displayed. For example, to invoke a command, a user may proceed through a sequence of choices and in the process bring up and/or go through one or more windows or dialog boxes. Some software applications are powerful and have many commands, capabilities, and/or features associated with it. As a result, it may be difficult for a user to find and/or remember a sequence of choices associated with, for example, a particular command. New users may be intimidated or discouraged by a new application. Even some experienced users may not remember the path or sequence of choices to access a less commonly used feature. It would be desirable if techniques could be developed to assist users in learning and/or locating the path to access a feature, command, or capabilities associated with a user interface.

BRIEF DESCRIPTION OF THE DRAWINGS

Various embodiments of the invention are disclosed in the following detailed description and the accompanying drawings.

DETAILED DESCRIPTION

Figure 1:
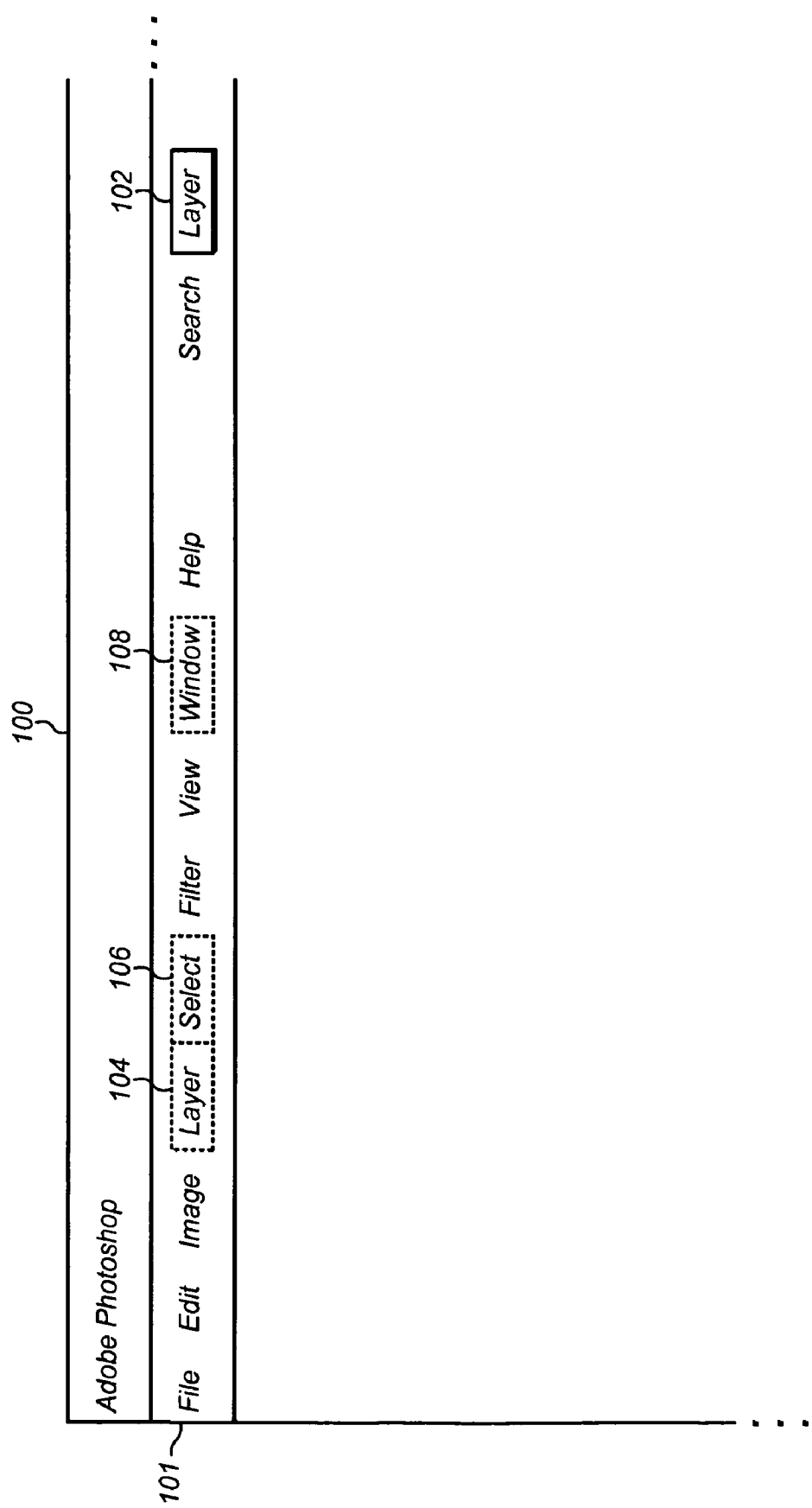
FIG. 1 is a diagram illustrating an embodiment of a user interface configured to have menu items that are searchable.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Searching objects associated with a user interface and displaying visual cues for at least a portion of a path to a search result is disclosed. One or more search criteria are received. One or more objects that are associated with a user interface are searched based at least in part on the one or more search criteria to obtain a search result. In some embodiments, searching includes obtaining a collection of information that is separate from files or other data associated with a help feature of a software application. For example, in some cases help files or other help data is quite large and loading and/or searching through help files may take a relatively long time. In some embodiments, a collection of information that is obtained and searched through is smaller than files or data associated with a help feature. In some embodiments, metadata or tags associated with user interface objects are searched. A sequence of one or more choices associated with accessing the search result is obtained. For example, the sequence may comprise items in a pull down menu that must be selected in order to get to the search result. A visual cue is displayed for at least a portion of the sequence of one or more choices. In some embodiments, the portion that is displayed corresponds to what is currently displayed. In some embodiments, windows, dialog boxes, or submenus associated with pull down menus that include part of a path to a search result do not automatically pop up as a result of a search.

FIG. 1 is a diagram illustrating an embodiment of a user interface configured to have menu items that are searchable. In the example shown, user interface 100 is associated with a software application, in this case Adobe® Photoshop®, and includes pull down menu 101. User interface 100 provides access to the various capabilities, commands, and/or features implemented by a software application for viewing, manipulating, exporting, printing, and/or deleting data associated with a file, image, or other data. To access a particular command, feature, or capability, a sequence of choices or a path associated with user interface 100 may be selected by a user. In some software applications, there may be more than one sequence of choices via which a particular command, operation, or feature is able to be accessed.

Some software applications have so many features or commands that a user may have difficulty remembering or locating a path that corresponds to a given command or feature. For example, a user may be a new user, or the command or feature may be used infrequently. User interface 100 is configured so that objects associated with user interface 100 are searchable.

Pull down menu 101 includes search box 102 in which a user has entered, "Layer." In various embodiments, a search interface (such as search box 102) is implemented in a variety of ways. In some embodiments, a user is able control the display of a search interface. For example, search box 102 may initially be displayed. A user may be able to toggle off/on the display of search box 102. In some embodiments, search criteria are specified using natural language and a natural language processor is used to interpret the search criteria into data that can be used to search the collection. In some embodiments, a search interface not integrated into a pull down menu such as pull down menu 101. In some embodiments, a search interface is included in a dialog box. The size and/or location of a dialog box may be adjusted as desired by a user, for example so that a file or other data that is being worked on is not blocked by the dialog box.

In various embodiments, a user interface includes a variety of objects. Accordingly, user interface objects that are searched may comprise a variety of objects in various embodiments. For example, in some embodiments, a user interface object comprises or includes graphical icons (some examples of which are illustrated in this figure) in addition to or as an alternative to text. In some embodiments, tool tips associated with graphical icons are searched and sequences of choices or paths for search results are indicating using visual cues. In some embodiments, a user interface object is associated with a palette, dialog box, tab, and/or menu. In some user interfaces, a palette remains displayed until a user closes the palette; display of a palette does not necessarily interrupt usage of a software application. In some user interfaces, a dialog box is used to obtain data at a certain point and/or usage of a software application is halted or interrupted until data is provided via the dialog box.

In some embodiments, a user interface is associated with a software application configured to run on a computer, such as Adobe® Acrobat® or Microsoft Internet Explorer. In some embodiments, a user interface is associated with a web-based application. In some embodiments, a user interface is associated with a client-server application. Some of the techniques described herein (e.g., for displaying visual cues) are modified in some embodiments.

In the examples illustrated herein, a user interface object that is searched is a node within a tree or hierarchy associated with user interface 100. For example, layer 104 may be one user interface object. Other user interface objects are accessible via layer 104 (e.g., objects in a submenu that is displayed by clicking on Layer 104) and each of those objects may be searched (e.g., separately from their parent, layer 104). In some embodiments, a given file system object will match a search or otherwise satisfy search criteria but a parent, (grand)child, and/or sibling will not.

In the example shown, the word "Layer" is used as a search criteria. In some embodiments, search criteria comprise one or more words that are searched for. Any appropriate search technique may be used. For example, Boolean operators such as AND or OR may be used in a search if there are multiple words being searched for. File system objects that match the search criteria and/or any search parameters (e.g., all search words found, at least one search word found, etc.) are added to a collection of search results.

Sequences of choices or paths are determined for each search result and at least a portion of these paths are indicating using a visual cue. In this example, a visual cue comprises a highlight and Layer 104, Select 106, and Window 108 are highlighted. Layer 104 is highlighted because the name includes the search word and/or user interface object that are accessible via Layer 104 (e.g., subsequent or lower-level nodes) include the search word. Select 106 and Window 108 do not include the search word "Layer" in their names, but are the top-level node in a sequence of choices or a path associated with a search result that does. An example associated with Window 108 is discussed in further detail below.

In the example shown, some portion of a path or sequence of choices associated with a search result is indicated using a visual cue. Each choice in a sequence or path may be a user interface object that is similarly searched. By indicating a path or sequence of choices using a visual cue, a new user may be able to learn about the features or capabilities of a computer application, and/or learn the path or sequence of menu choices, button pushes, and/or tab selections via which a command, operation or feature is invoked or otherwise accessed. Similarly, this may enable an experienced user to, for example, learn about new features of a new version of an application, or enable the user to search for the path to bring up a less frequently used dialogue box.

In various embodiments, the location or placement of a visual cue with respect to an associated user interface object varies. For example, in some embodiments, a visual cue is overlaid on an object. In some embodiments, a visual cue is a check, a star, or other mark placed adjacent to an object, surrounds an object, etc. In some embodiments, a path or sequence of choices that is indicated using a visual cue includes text and/or an icon. For example, in some embodiments, icons that are associated with a search result are indicated using a visual cue. An icon may be an initial, intermediate, or end/terminal choice in a sequence of choices via which a search result is accessed.

Illustrating a path or sequence of choices as described may be more helpful to a user than some other techniques. For example, some applications have a help application or feature that includes search capabilities. Some of these help features are relatively resource intensive (e.g., with respect to shared processing or memory resources) and take resources away from the software application itself. Also, these help features may have their own separate display. These help displays may obstruct or block a user's view of the software application. Some other techniques highlight or otherwise illustrate only a search result and do not illustrate the path or sequence of choices that corresponds to a search result. In some cases this may not be as helpful, since a user would first have to correctly select all but one choice in a sequence in order to see the last choice (i.e., the user interface objects that resulted from a search) highlighted or otherwise indicated.

In some embodiments, a user interface is configured to be able to clear or otherwise remove visual cues that are displayed. For example, in some embodiments, a search interface may include a clear button. Pushing the clear button may cause the highlight or other visual cue to be removed and/or for search criteria to be cleared (e.g., the word "Layer" is removed from search box 102). In some embodiments, a new search causes visual cues associated with a previous search to be removed or cleared. In some embodiments, a visual cue is cleared as or after a user selects the choice corresponding to that visual cue.

Figure 2:
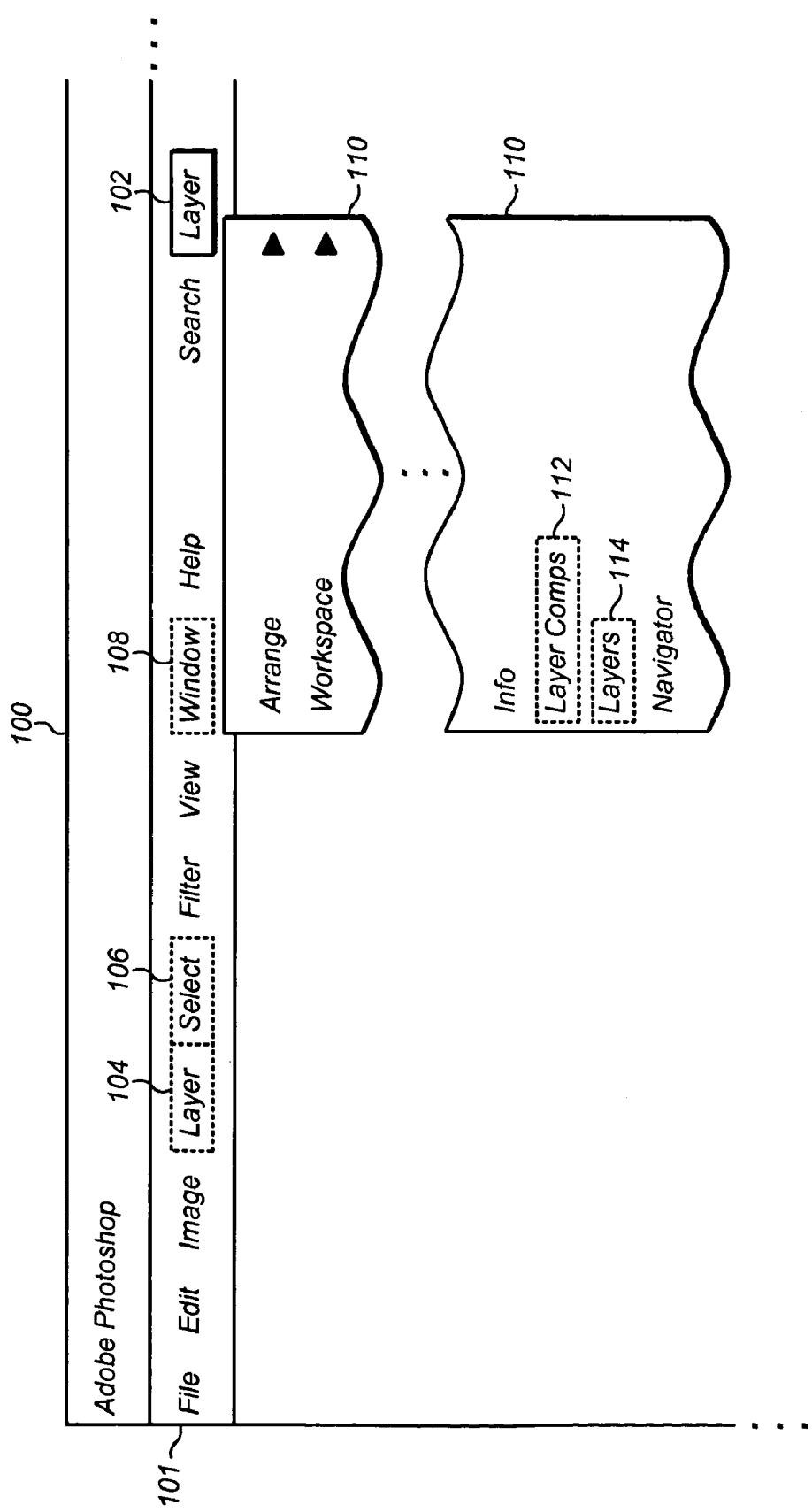
FIG. 2 is a diagram illustrating an embodiment of a sub-menu associated with a pull down menu in which choices associated with search results are indicated using visual cues.

FIG. 2 is a diagram illustrating an embodiment of a submenu associated with a pull down menu in which choices associated with search results are indicated using visual cues. In the example shown, a user has selected Window 108 (which is highlighted as a result of a search using the search word "Layer" entered into search box 102) and submenu 110 is displayed as a result of the user's selection of Window 108. A user may cause submenu 110 to be displayed in a variety of ways, for example by placing a mouse pointer over Window 108 and holding down or clicking a button of the mouse. Layer Comps 112 and Layer 114 in submenu 110 are highlighted. Both items contain the search word "Layer" and are indicated using a highlight, which is the visual cue for this example. To access the highlighted items Layer Comps 112 and Layer 114, Window 108 must first be selected. As such, Window 108 is indicated using a visual cue since it is included in the paths for Layer Comps 112 and Layers 114 even though Window 108 does not necessarily include the search word "Layers" in its name.

There may be any number of choices in a sequence of choices or path associated with a search result. In some embodiments, a path or sequence of choices does not necessarily end at an end or terminal object or item. For example, in some embodiments, a sequence of choices ends at an intermediate object or item that has subsequent or lower level choices associated with it. For example, if subsequent or lower level choices associated with Layers 114 (including all subsequent or lower level choices until end or terminal objects are reached) do not include the word "Layer," in some embodiments Layers 114 would still be highlighted. Subsequent or lower level choices that do not satisfy a search are not necessarily highlighted or otherwise indicated using a visual cue.

In some embodiments, only the portion of a path that is currently being displayed is illustrated. That is, in some embodiments, submenu 110 will not automatically pop up or otherwise be automatically displayed if submenu 110 is not already being displayed. For example, a user may find it annoying to have submenu 110 and/or other windows, dialog boxes, or palettes pop up each time a search is performed.

As shown in this example, other portions of a path or sequence of choices are indicated as a user interacts with a user interface. For example, new windows, dialog boxes, or palettes are displayed as a user interacts with user interface 100. In some embodiments, visual cues (e.g., highlighting) are displayed until they are cleared and/or a new search is performed. This may, for example, enable a user to go through the entire path or sequence of choices to find the user interface object the user is searching for.

Figure 3:
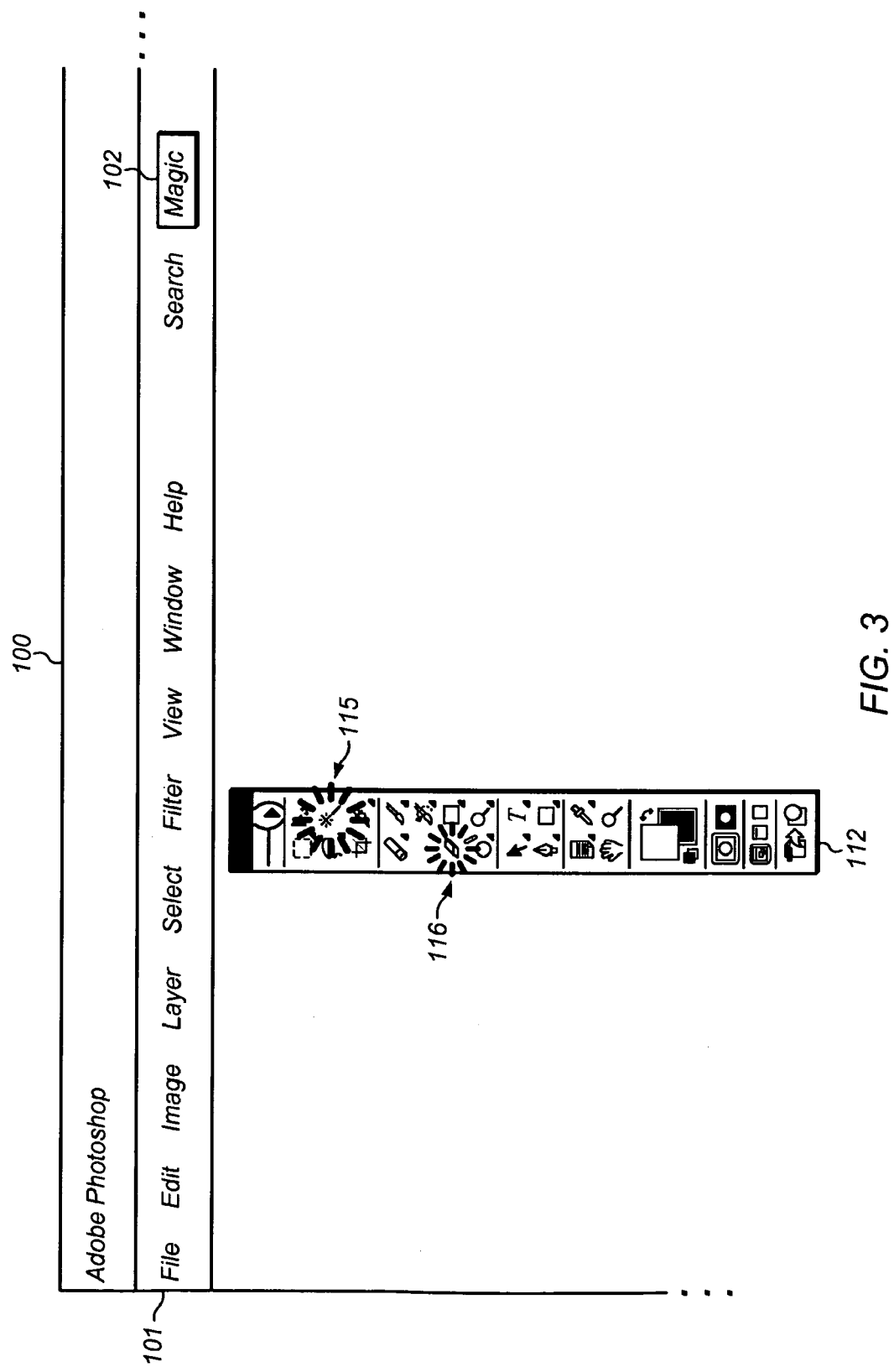
FIG. 3 is a diagram illustrating an embodiment of a tools window in which choices associated with a search result are indicated using a visual cue.

FIG. 3 is a diagram illustrating an embodiment of a tools window in which choices associated with a search result are indicated using a visual cue. In the example shown, a user has entered the word "Magic" in search box 102. Two tools accessible via tools window 112 that result from the search are the Magic Eraser tool and Magic Wand tool. In this example, the names of tools are searched and the search results include the Magic Eraser tool and the Magic Wand tool since both of their names include the word "magic." In some embodiments, other information besides a name (e.g., a tag or metadata) is searched and/or the objects being searched include other objects in addition to or as an alternative to tools.

The Magic Wand tool is accessible via Magic Wand icon 115 in tools window 112. For example, by left-clicking on Magic Wand icon 115, a second row is displayed under pull down menu 101. This second row includes commands, features, and/or operations associated with the Magic Wand tool. To indicate that a path or sequence of choices to the Magic Wand tool includes Magic Wand icon 115, Magic Wand icon 115 is indicated using a visual cue. In this example, the visual cue comprises blinking, and Magic Wand icon 115 blinks.

The Magic Eraser tool is accessible via Eraser icon 116. To access the Magic Eraser tool, a user may place his mouse pointer over and right-click on Eraser Tool icon 116 to display a list of eraser tools, including Eraser tool, Background Eraser tool, and Magic Eraser tool (which may also be blinking). The user may move his mouse over the displayed list of eraser related tools and select the Magic Eraser tool, which in some embodiments is blinking in the displayed list. Since Eraser Tool icon 116 is included in a path or sequence of choices via which a search result (i.e., Magic Eraser tool) is accessible, Eraser Tool icon 116 is visually indicated using blinking.

In various embodiments, a visual cue comprises a variety of things. In some embodiments, a visual cue uses color or highlighting (e.g., an icon or text that is colored and other icons or text are grey or black). In some embodiments, a border or outline is used. In some embodiments, a visual cue is a mark or some indicator displayed adjacent to a selection or choice. In some embodiments, some font effect is used, such as italicizing, bold typing, or underlining. In some embodiments, a visual cue is time varying. For example, in some embodiments a visual cue uses blinking, fading in/out, moving, etc.

Figure 4:
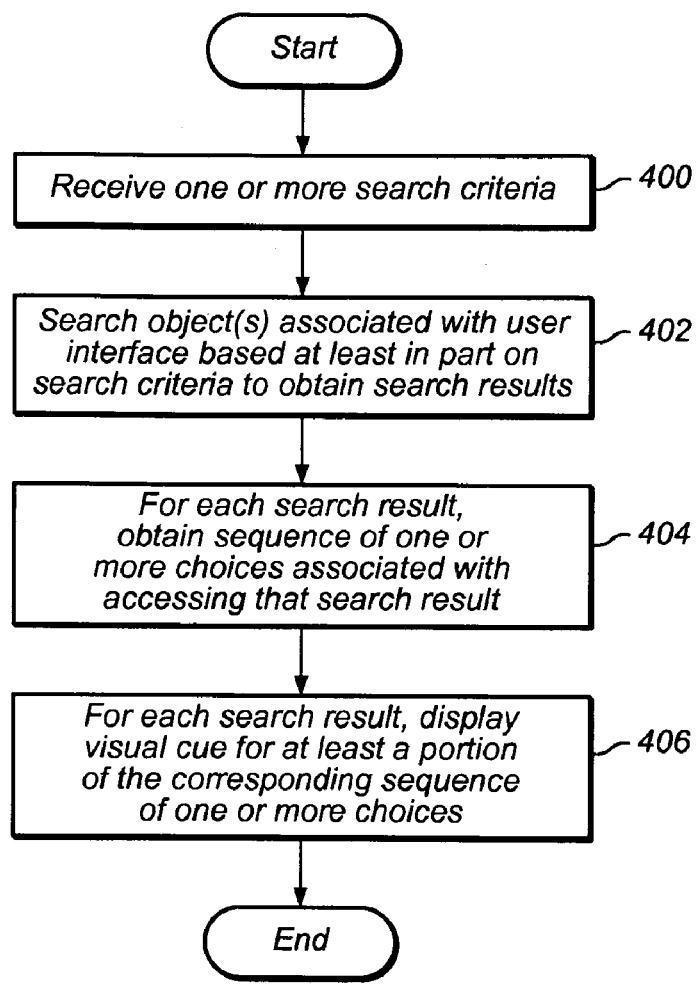
FIG. 4 is flowchart illustrating an embodiment of a process for searching user interface objects and indicating at least a portion of a sequence of choices associated with a search result.

FIG. 4 is flowchart illustrating an embodiment of a process for searching user interface objects and indicating at least a portion of a sequence of choices associated with a search result. In the example shown, a user interface associated with an application is configured so that a user is able to search through objects associated with the object interface.

At 400, one or more search criteria are received. For example, a user may provide one or more words to search for via a search interface. In various embodiments, a search interface comprises a palette, a search box embedded into the menu bar of a user interface (e.g., as shown in FIGS. 1-3), etc.

Object(s) associated with a user interface are searched based at least in part on search criteria to obtain a search result at 402. In some embodiments, a collection of information that contains information associated with user interface objects is obtained and searched through. Some embodiments of searching are described in further detail below.

At 404, for each search result, a sequence of one or more choices is obtained that is associated with accessing that search result. For example, the path of a search result is traced or crawled through the tree or hierarchy of the user interface until the highest point or initial choice is reached. An embodiment of this is discussed in further detail below.

At 406, for each search result, a visual cue is displayed for at least a portion of the corresponding sequence of one or more choices. For example, the portion that is displayed may be the portion that is currently displayed. As additional portions of the sequence or path are displayed (e.g., as a user causes windows, dialogue boxes, or submenus associated with pull down menus to be displayed), visual cues are displayed for those newly displayed portions. Some techniques for displaying a visual cue are described in further detail below.

In some cases there is more than one path or sequence associated with a search result. In some embodiments, all paths or sequences associated with a particular search result are displayed. In some embodiments, more than one user interface object satisfies the search criteria. In some embodiments, paths are displayed for a subset of the user interface objects that satisfy the search criteria (e.g., user interface objects are ranked and paths are visually indicated for those user interface objects with the highest rankings).

Figure 5:
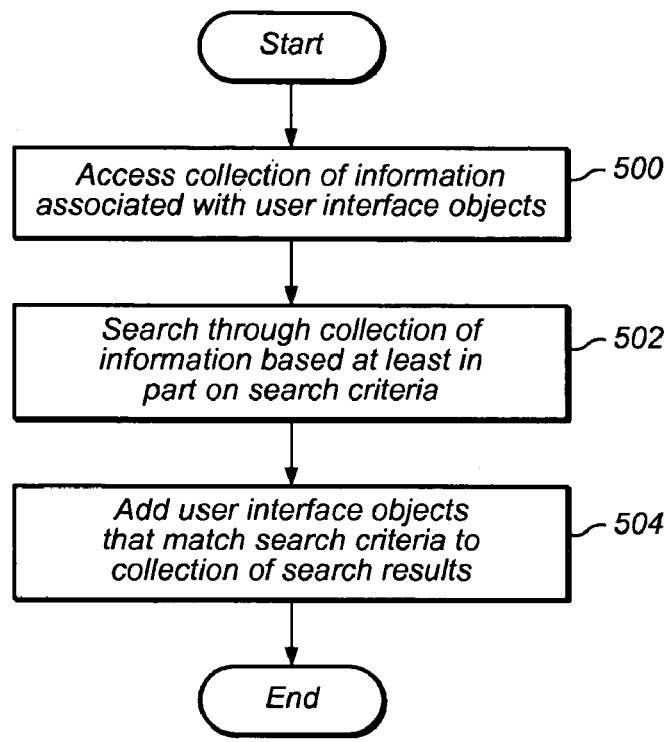
FIG. 5 is a flowchart illustrating an embodiment of a process for searching user interface objects.

FIG. 5 is a flowchart illustrating an embodiment of a process for searching user interface objects. In the example shown, a collection of information that includes information associated with user interface objects is obtained and searched. In some embodiments, the illustrated process is used at 502 to perform a search. In some embodiments, other techniques besides the example illustrated are used.

At 500, a collection of information associated with user interface objects is accessed. In some embodiments, a collection of information comprises one or more files, databases, tables, etc. In some embodiments, a collection of information is a relatively small collection of information so that a search may be performed relatively quickly and/or using relatively few resources. In some embodiments, a collection of information is organized or otherwise arranged to enable faster searching.

In some embodiments, a collection of information accessed at 500 includes names of user interface objects. In some embodiments, a collection of information includes other information in addition to or as an alternative to names. For example, in some embodiments, metadata associated with user interface objects is included in a collection of information that is searched. In some embodiments, metadata includes information assigned to a user interface object by a developer associated with the user interface. For example, metadata may be used to include alternate or root forms of a word so that if a user searches on the word "Coloring" a user object with a name that includes "Color" would be included in the search results. In some cases, metadata includes synonyms of a word. In some cases, metadata includes a general category or classification associated with a file system object. Metadata may include a variety of information in various embodiments.

In some embodiments, a collection of information that is searched includes one or more tags associated with user interface objects. In some embodiments, a tag is specified by a user (e.g., the user currently interacting with a user interface or another user). For example, a user may user a certain command infrequently. To locate a path associated with the command later, the user may assign a tag to a user interface object associated with the command. For example, the tag may be "Jackpot" or something else the user will remember to use as a search word later on. In some embodiments, a tag is applied to more than one user interface object. This may, for example, enable a user to be able to find paths for a user-defined set of objects.

In some embodiments, a collection of information that is searched is not part of or is not associated with a help feature. For example, some help features associated with user interfaces are very resource intensive. In some cases, there are many help files or other data associated with a help feature and searching through these help files may be time consuming.

At 502, the collection of information is searched through based at least in part on search criteria. In some embodiments, one or more search parameters are used in searching. Some or all of these search parameters may user specified. In some embodiments, a search parameter includes a maximum number of search results to display paths for, Boolean operators to use (e.g., use the Boolean operator AND so that a search result contains all search criteria, or use the Boolean operator OR so that a search result contains at least one of the search criteria), etc. In some embodiments, a search parameter is set to a default or initial value.

User interface objects that match search criteria are added to a collection of search results at 504. In some embodiments, all search results that are found are used in subsequent processing (e.g., determining paths associated with search results, displaying visual cues, etc.). In some embodiments, not all search results are added to a collection of search results. For example, in some embodiments, search results are ranked and only a certain number of search results are processed further. In some embodiments, a maximum number of search results (should such a maximum be used) is specified by a user.

Figure 6:
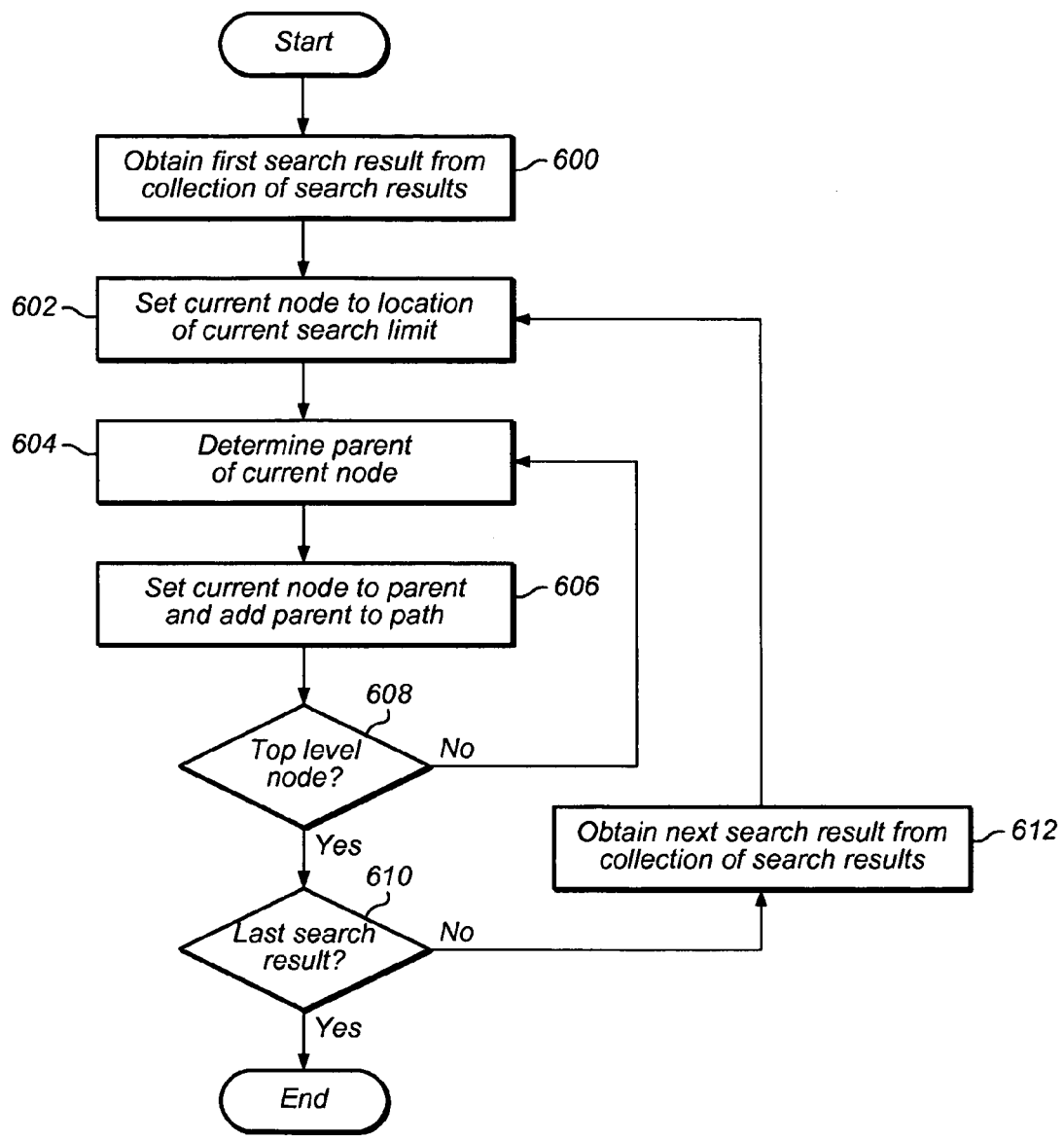
FIG. 6 is a flowchart illustrating an embodiment of a process for determining a path or sequence of choices associated with a search result.

FIG. 6 is a flowchart illustrating an embodiment of a process for determining a path or sequence of choices associated with a search result. In the example shown, the process is used in some embodiments at 404.

At 600, a first search result is obtained from collection of search results. In various embodiments, search results in a collection are processed in various orders. At 602, a current node is set to the location of current search result. The current node may be used to track where in a tree or hierarchy associated with a user interface a process is currently at. A parent of the current node is determined at 604. In some cases, there is more than one parent. In some embodiments, the process determines all paths associated with a given search result. For example, a process may remember the current node at which there where multiple parents, copy the path up to the branch, and return later to continue tracing the other path from the branch upwards.

At 606, the current node is set to a parent and a parent is added to the path. It is determined at 608 whether a current node is a top level node. Referring back to the example of FIG. 2, Layer 104, Select 106, and Window 108 are top level nodes. Layer Comps 112 and Layers 114 are not top level nodes.

If a current node is not a top level node, a parent of the current node is determined at 604. Otherwise, it is decided at 610 whether it is the last search result. If it is not the last search result, a next search result is obtained from the collection of search results at 612.

In some embodiments, a different technique is used to obtain a path associated with a search result. For example, in some embodiments, paths are pre-determined and stored in a library, file, database, or table of paths. A process may retrieve this stored information to obtain a path associated with a given user interface object.

Figure 7:
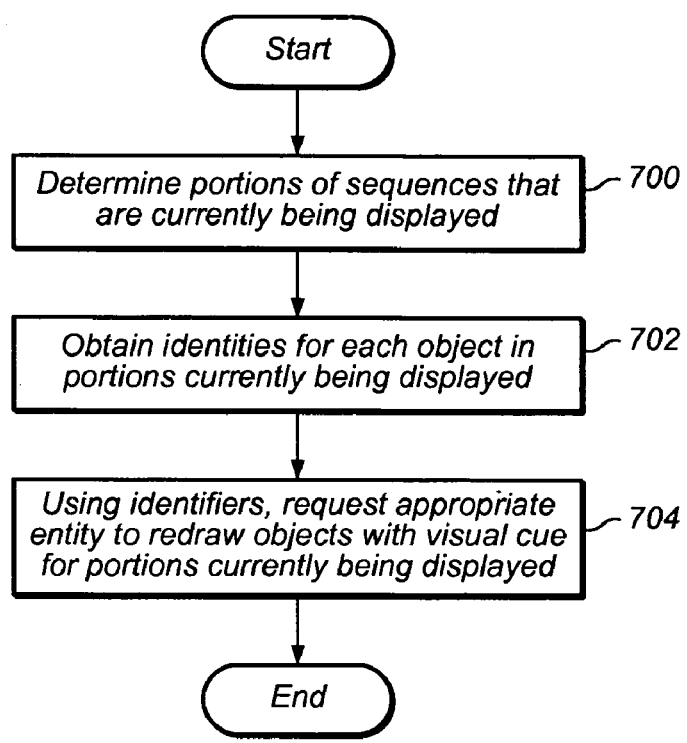
FIG. 7 is a flowchart illustrating an embodiment of a process for displaying visual cues for the portion of a sequence of choices that is currently being displayed.

FIG. 7 is a flowchart illustrating an embodiment of a process for displaying visual cues for the portion of a sequence of choices that is currently being displayed. In the example shown, the technique may be used for user interfaces associated with a software application running on a computer, a web-based application, or a client-server application. Some of the techniques described may be modified as appropriate based on the implementation or environment of a particular embodiment.

At 700, portions of sequences that are currently being displayed are determined. At 702, identifiers are obtained for each object in portions that are currently being displayed. In some embodiments each user interface object is associated with a unique identifier which is used to identify a given user interface object. An identifier may be passed to, for example, an Application Programming Interface (API) when requesting an API to indicate part of a path by, for example, redrawing or redisplaying a user interface object to have a visual cue. At 704, using the identifiers, an appropriate entity is requested to redraw objects with a visual cue for portions currently being displayed.

In some embodiments, as a user changes a display (e.g., by causing new windows, dialog boxes, or palettes to be displayed) new portions of paths are displayed. Visual cues may be displayed for these newly exposed objects using various techniques. In some embodiments visual cues are indicated on the fly and corresponding processing is triggered each time a user causes the display of a user interface to change. For example, as a user traverses through the path and causes new windows, dialog boxes, or palettes to be displayed, newly exposed portions of paths are determined and visual cues for those newly exposed portions are displayed. In some embodiments, the processed described above (or some modified version of it) is repeated as new submenus, tabs, dialog boxes or other objects are visually exposed. In some embodiments, modifications or changes associated with displaying visual cues are performed ahead of time (e.g., to reduce processing).

For example, even though a given object in a path may not necessarily be displayed at the time a search is performed, data associated with that object is modified so that should it be displayed, the object will have a visual cue displayed with it.

In some embodiments, one or more resource files are used in displaying a visual cue associated with a path. For example, a resource file may be compiled into a software application. When the software application is initiated, a resource file is loaded into memory. An identifier associated with a user interface object (for which a visual cue will be displayed) is passed to a resource file and an index is obtained. This index may be passed to an API and the API may be instructed to, for example, color (or use some other visual cue) user interface object.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving one or more search criteria;
searching for one or more user interface objects according to the search criteria, wherein each user interface object belongs to a user interface for a software application, and wherein each user interface object is configured to invoke a particular command, operation, feature, or capability of the software application;
dependent upon the results of the searching, constructing one or more ordered paths, each comprising a sequence of several nodes within a hierarchy of user interface objects, such that at least one member of the sequence is identified from the search results, and wherein each of the one or more ordered paths is traversable by a user via sequentially selecting a plurality of nodes from the corresponding sequence of several nodes to reach the at least one member and invoke the particular command, operation, feature, or capability of the software application via the at least one member, wherein the sequence of several nodes within the hierarchy of user interface objects includes an object associated with a menu; and
displaying a visual cue indicating at least a portion of one of the one or more ordered paths.

2. A method as recited in claim 1, wherein searching includes searching metadata associated with the one or more user interface objects.

3. A method as recited in claim 1, wherein searching includes searching tags associated with the one or more user interface objects.

4. A method as recited in claim 1, wherein the constructing includes retrieving a saved path associated with the search result.

5. A method as recited in claim 1, wherein the visual cue includes at least one of a highlight, an adjacent mark, or blinking.

6. A method as recited in claim 1, wherein displaying includes using an Application Programming Interface (API).

7. A method as recited in claim 1, wherein displaying includes using a resource file associated with the user interface.

8. A method as recited in claim 1, wherein the sequence of several nodes within the hierarchy of user interface objects includes an object associated with a pull-down menu.

9. A method as recited in claim 1, wherein the sequence of several nodes within the hierarchy of user interface objects includes an object associated with a dialog box.

10. A method as recited in claim 1, wherein one of the sequence of several nodes within the hierarchy of user interface objects is not currently being displayed, and is not automatically displayed as a result of the searching.

11. A method as recited in claim 1, further comprising:
receiving an indication to display one of the sequence of several nodes within the hierarchy of user interface objects that is not currently being displayed; and
displaying that node with a visual cue.

12. A method as recited in claim 1, further comprising:
receiving an indication associated with clearing the display of the visual cue; and
clearing the display of the visual cue.

13. A system, comprising:
a processor, and a memory coupled with the processor, wherein the memory is configured to provide the processor with instructions which when executed cause the processor to:
receive one or more search criteria;
search for one or more user interface objects according to the search criteria, wherein each user interface object belongs to a user interface for a software application, and wherein each user interface object is configured to invoke a particular command, operation, feature, or capability of the software application;
dependent upon the results of the searching, constructing one or more ordered paths, each comprising a sequence of several nodes within a hierarchy of user interface objects, such that at least one member of the sequence is identified from the search results, and wherein each of the one or more ordered paths is traversable by a user via sequentially selecting a plurality of nodes from the corresponding sequence of several nodes to reach the at least one member, wherein the sequence of several nodes within the hierarchy of user interface objects includes an object associated with a menu; and
display a visual cue indicating at least a portion of one of the one or more ordered paths.

14. A system as recited in claim 13, wherein the instructions for displaying include instructions for displaying an Application Programming Interface (API).

15. A system as recited in claim 13, wherein one of the sequence of one or more user interface objects is not currently being displayed, and is not automatically displayed as a result of the searching.

16. A system as recited in claim 13, wherein the memory is further configured to provide the processor with instructions which when executed cause the processor to:
receive an indication to display one of the sequence of several nodes within the hierarchy of user interface objects that is not currently being displayed; and
display that node with a visual cue.

17. A system as recited in claim 13, wherein the memory is further configured to provide the processor with instructions which when executed cause the processor to:
receive an indication associated with clearing the display of the visual cue; and
clear the display of the visual cue.

18. A computer program product, the computer program product being embodied in a non-transitory computer readable medium and comprising computer instructions for:
receiving one or more search criteria;
searching for one or more user interface objects according to the search criteria, wherein each user interface object belongs to a user interface for a software application, and wherein each user interface object is configured to invoke a particular command, operation, feature, or capability of the software application;

dependent upon the results of the searching, constructing one or more ordered paths, each comprising a sequence of several nodes within a hierarchy of user interface objects, such that at least one member of the sequence is identified from the search results, and wherein each of the one or more ordered paths is traversable by a user via sequentially selecting a plurality of nodes from the corresponding sequence of several nodes to reach the at least one member and invoke the particular command, operation, feature, or capability of the software application via the at least one member, wherein the sequence of several nodes within the hierarchy of user interface objects includes an object associated with a menu; and displaying a visual cue indicating at least a portion of one of the one or more ordered paths.

19. A computer program product as recited in claim 18, wherein the computer instructions for displaying include computer instructions for displaying an Application Programming Interface (API).

20. A computer program product as recited in claim 18, wherein one of the sequence of several nodes within the hierarchy of user interface objects is not currently being displayed, and is not automatically displayed as a result of the searching.

21. A computer program product as recited in claim 18, the computer program product further comprising computer instructions for:

receiving an indication to display one of the sequence of several nodes within the hierarchy of user interface objects that is not currently being displayed; and displaying that node with a visual cue.

22. A computer program product as recited in claim 18, the computer program product further comprising computer instructions for:

receiving an indication associated with clearing the display of the visual cue; and clearing the display of the visual cue.

* * * * *